United States Patent [19]

Rao et al.

[11] Patent Number: 5,246,719
[45] Date of Patent: Sep. 21, 1993

[54] PROCESS OF PREPARING A BATTER-FREE BREADED POULTRY PRODUCT AND PRODUCT THEREBY

[75] Inventors: Ganta V. Rao, Louisville; Michael O. Gross, Crestwood, both of Ky.

[73] Assignee: KFC Corporation, Louisville, Ky.

[21] Appl. No.: 12,553

[22] Filed: Feb. 2, 1993

Related U.S. Application Data

[63] Continuation of Ser. No. 778,789, Oct. 18, 1991, abandoned.

[51] Int. Cl.$^5$ .............................................. A23L 1/315
[52] U.S. Cl. ..................................... 426/92; 426/292; 426/296; 426/644
[58] Field of Search ................ 426/92, 644, 289, 291, 426/292, 293, 296

[56] References Cited

U.S. PATENT DOCUMENTS

| | | |
|---|---|---|
| 2,910,370 | 10/1959 | Rogers et al. |
| 3,078,172 | 2/1963 | Libby |
| 3,169,069 | 2/1965 | Hanson et al. |
| 3,527,646 | 9/1970 | Scheick et al. |
| 3,723,137 | 3/1973 | Fischer et al. |
| 4,068,009 | 1/1978 | Rispoli et al. ................... 426/296 X |
| 4,208,442 | 6/1980 | Evans et al. ...................... 426/92 X |
| 4,511,583 | 4/1985 | Olson et al. ..................... 426/296 X |
| 4,518,620 | 5/1985 | Monagle et al. ................. 426/296 X |
| 4,741,933 | 5/1988 | Larsson et al. ...................... 426/291 |
| 4,744,994 | 5/1988 | Bernacchi et al. ................... 426/293 |
| 4,948,603 | 8/1990 | Bernacchi et al. ............. 426/296 X |

*Primary Examiner*—Arthur L. Corbin
*Attorney, Agent, or Firm*—Scully, Scott, Murphy & Presser

[57] ABSTRACT

Poultry pieces, preferably chicken, are breaded without forming a batter, by adhering high gluten flour dust to the pieces, hydrating the dust sufficiently to render the dust tacky, and then adhering breading to the hydrated dust. The product exhibits the favorable properties of breaded poultry while avoiding the unfavorable tendency of batters to separate from the underlying piece.

13 Claims, No Drawings

PROCESS OF PREPARING A BATTER-FREE BREADED POULTRY PRODUCT AND PRODUCT THEREBY

This is a continuation of copending application Ser. No. 778,789, filed on Oct. 18, 1991, now abandoned.

FIELD OF THE INVENTION

The present invention relates to edible poultry products, notably chicken and turkey, having adhered thereto a layer of breading to contribute texture and flavor to the product and to help the product retain its desired moisture content on cooking.

BACKGROUND OF THE INVENTION

Battered, breaded poultry pieces have been known for some time. Unfortunately, the several drawbacks exhibited by such products have also become well known.

In general, such products are prepared by separately formulating a batter of flour, water, optional flavoring ingredients, and other optional additives, and then coating the poultry piece with the batter. The batter can also contain typically egg and milk derivatives. The batter is then applied to the poultry piece. The batter coating forms a film around the piece of meat. Frequently, a layer of breading is then applied to the moist batter layer. The breading typically comprises small particles of dried bread or equivalent material and frequently includes seasonings and coloring agents to impart desired final qualities to the product. The thus prepared piece of meat can then be cooked, or can be frozen for cooking at a later time.

The batter coating accomplishes in general one desired objective, namely preserving the moistness of the enrobed meat when the piece is eventually cooked and consumed. However, the quality and flavor of the meat can suffer nonetheless. In addition, the batter and breading usually adhere only poorly, if at all, to the cooked piece, which results in the unfavorable experience that the breading falls off the meat product before, or while, it is in the hands of the consumer. Thus, there is a need for an improved product and process which provide a layer of breading to the surface of a piece of poultry, which will impart the desired performance but which will not exhibit poor adhesion to the product.

Previous attempts to provide coated, breaded poultry products are not entirely satisfactory and do not presage the present invention. For instance, in U.S. Pat. No. 3,527,646 a layer of dry material at least 50% of which is pregelatinized starch is applied to the surface of the product, followed by moisture in an amount sufficient to convert the starch into what is, in effect, a layer of batter. Thus, the disclosed technique alters the manner in which a batter film is formed, but still leads to the formation of a batter layer which would exhibit the same detrimental performance characteristics. U.S. Pat. No. 3,723,137 likewise alters the sequence of steps in which the batter is formed, still using pregelatinized starch as the major component of the batter, but still leads to nothing more than a battered product which would not change the undesirable characteristics of a batter film on a poultry piece.

More recently, U.S. Pat. No. 4,741,933 also requires coating the food product with a batter and expressly teaches away from forming the coating with materials which have a high gluten content. By contrast, flour having high gluten content is a significant aspect of the present invention.

By way of further background, U.S. Pat. No. 3,078,172 typifies the technique discussed above of applying a batter to seal the food product, and then applying bread crumbs, cereal crumbs or other coating material to the batter. U.S. Pat. No. 2,910,370 is also typical of previously known techniques in which the poultry product is coated with a batter. In U.S. Pat. No. 3,169,069 a conventional batter layer is applied to a precooked food piece; the battered piece must then be cooked again, for instance, deep fried, to prepare it to be eaten.

BRIEF SUMMARY OF THE INVENTION

In one aspect of the present invention, the aforementioned drawbacks are avoided, and the advantages discussed herein are realized, by a process which comprises providing a piece of uncooked poultry; adhering to the surface of said piece a dust of ungelatinized, high gluten flour; hydrating said dust under conditions effective to render the hydrated dust capable of adhering to breading; and adhering breading to said hydrated dust.

Another aspect of the present invention comprises a poultry product, having adhered to the surface thereof a dust of ungelatinized, high gluten flour, and having a layer of breading adhered to said dust.

DETAILED DESCRIPTION OF THE INVENTION

As indicated, the present invention is useful for the preparation of edible poultry meat products, such as chicken or turkey. The preferred embodiment is pieces of chicken, including wings, thighs, and breasts. By "meat product" is meant herein any of the aforementioned pieces, as well as half or whole chickens, containing edible flesh, which may also contain the naturally occurring bone(s) or may have had the bone(s) removed. The products that comprise the present invention may still retain the original skin or, more preferably, will have had the skin previously removed to expose the edible flesh surface.

One aspect of the present invention comprises adhering a dust of ungelatinized, high gluten flour to the surface skin or flesh, as the case may be, of such a product. The dust is preferably "moisture-free" or essentially dry, by which is meant that the water content can be below about 10%. It will be recognized that the dust components may contain some inherent (i.e. residual internal or ambient) water; it should be dry enough to be free-flowing particles, capable of being picked up onto the meat or skin surface, as distinguished from a damp cake or slurry. Preferably, the dust is essentially dry. It will thus be appreciated that, for the desired adhesion to occur, the meat product should have at least a modest degree of surface moisture. No special moistening treatment is necessary unless for some reason the meat product has become completely dry at its surface. Generally, the slight dampness exhibited by cooled raw poultry pieces in an atmosphere of ambient temperature and humidity will provide sufficient moisture to let the desired adhesion occur. Excessive moisture, such as sufficient water on the surface of the meat product so that droplets form or run off, should be avoided, as such a condition might lead to loss of the desired dust coating as the dust is applied.

One optional, but preferred, step is to marinate the meat piece in a water-based marinade to impart to the piece additional moistness, particularly in the interior of the piece, and to give the piece any desired flavor, texture or color, consistent with the traditional functions of a marinade. Marinating the piece is thus one effective means for providing the surface of the piece with a sufficient level of moistness to permit the indicated dust to adhere to the surface of the piece. The choice of particular ingredients used in the marinade is not critical to the desired object of providing a slight degree of moistness to the surface of the piece.

The dust which is applied to the surface of the meat piece is characterized as ungelatinized, high gluten flour. The dust should not be capable of forming a continuous film of batter when it is applied to the surface of the piece. To this objective, the dust is preferably ungelatinized, and should be free of batter-forming components such as modified starches. By flour with a high gluten content is meant a gluten content over about 10%, preferably at least about 15%, and more preferably over about 25%. Such a flour can be obtained by processing high-gluten wheat, corn or other cereal into flour, or by processing a lower-gluten wheat, corn or other cereal into flour and then adding gluten in an amount to provide the desired high gluten content to the flour.

A dust of high gluten flour provides these advantages: increased adhesion of the dust to the meat, increased ability to take up dust, desirably flaky texture of the coating, and reduced absorption of oil during hot-oil cooking of the meat piece. Providing flour with too low a gluten content is undesirable, as it leads to a tendency of the bread to flake off, or to puff up during cooking, and to a tendency of the meat to shrink and/or to absorb excessive amounts of oil during cooking. In particular, the dust forms a layer whose adhesion to the meat piece is greater than its cohesion to adjacent dust particles. Soy flour notably improves this adhesion, so the dust preferably contains at least about 5%, and more preferably at least about 10%, soy flour.

The particle size of the dust is not critical, and will typically be of the same range as conventional commercial flours. The dust may optionally contain other ingredients such as salt and flavoring agents, up to a total of about 10% by weight of the dust.

The dust can be applied to the meat piece by dredging the piece through the dust, or the dust can be sprinkled or applied onto the meat piece. Preferably, the dust covers all of the exposed skin and edible flesh surfaces of the piece, although it will be appreciated that the advantages of the present invention are exhibited through (to a lesser degree) if even only a part of the piece receives the dust.

The dust can be based on one or more cereal based flours such as wheat flour, oat flour, corn flour, or mixtures thereof. Preferably, the flour is high protein (hard) wheat flour. By "hard" is meant that the flour is one of any of the known varieties of hard winter wheats.

The next aspect of the present invention is hydration of the dust layer on the piece of meat. Hydration is carried out under conditions effective to permit the hydrated dust to adhere to moisture-free breading which is applied in a subsequent step described herein. Hydration as that term is used herein is preferably carried out by passing the dusted piece through a fine, gentle mist of water sprayed from a plurality of nozzles. Of course, the force of the water spray should not be so high as to dislodge any of the dust from the piece. While a minor amount of experimentation may be necessary to optimize the hydration conditions as a function of the composition of the dusting flour and the composition of the subsequently applied breading, it has been found satisfactory to apply a gentle spray to a piece of chicken for up to about 3 to 15 seconds. It is permissible thereafter to allow the sprayed piece to rest in a moist atmosphere for up to about 2 minutes, preferably about 30 seconds. In general, it will be recognized that sufficient hydration has occurred if the dusted surface takes on a slightly tacky feel to the touch.

A layer of breading is then applied to the hydrated, dusted surface. By "breading" is meant any type of free-flowing particulate bread-based or cereal-based compositions like those conventionally known at present. The breading is preferably essentially free of surface liquid, but may have an inherent moisture content up to about 5 to 10 wt. %. The breading composition may also contain seasonings, such as salt, pepper or other flavoring agents that may be desired by the practitioner. The breading may be essentially raw, or may have been slightly cooked to impart a reddish or brownish color to the breading before it is applied to the poultry piece. The breading may be applied to the poultry piece by dredging the piece through a layer of breading material, or the breading may be sprinkled or otherwise deposited onto the surfaces of the poultry piece. Preferably; the breading will cover all of the exposed hydrated dust on the surface of the piece.

The piece thus prepared can be cooked immediately, for instance by baking or deep-fat frying, and eaten. Alternatively, the piece can be frozen so that it can be cooked and eaten at any later time.

The material thus applied to the poultry piece exhibits very satisfactory adhesion to the poultry piece, upon initial application. It also exhibits improved adhesion under the subsequent conditions of freezing, cooking, and eating, and the handling normally attendant with each such step.

The breading layer thus applied also exhibits remarkably low pickup of cooking oil in the subsequent deep-fat frying step. The layer also retains a very high proportion of the original moisture of the poultry piece, even after cooking.

The product produced by the steps described above is thus characterized in having a layer of ungelatinized, high gluten flour adhered to its surface and having a layer of breading adhered to the flour layer. The product is characterized in that it does not bear a layer of batter. Thus, there is no layer which can be peeled off the meat piece.

The invention will be described further in the following example, which is intended for purposes of illustration and should not be used to limit the invention in any way.

EXAMPLE

Deskinned chicken pieces, which had been injected with a conventional flavoring marinade, were tumbled in a dust of high gluten flour having the following characteristics:

| | |
|---|---|
| Wheat Gluten | 10 wt. % |
| Soy Flour | 25 wt. % |
| Seasonings and Salt | 5 wt. % |
| Leavening Agent | 400 ppm |

| | |
|---|---|
| Wheat Flour | Balance |

The gluten content of this composition was about 15%.

The thus dusted pieces were then hydrated by spraying them with water from nozzles operating at a flow rate of 1 gram per second per nozzle. The dwell time of each piece in the hydration step was about 45 seconds. The dust on the chicken pieces had by then become satisfactorily hydrated to permit adhesion of the breading. The hydrated pieces were then tumbled in a moisture-free breading composition having the following characteristics:

| | |
|---|---|
| Wheat Gluten | 10 wt. % |
| Seasonings and Salt | 6 wt. % |
| Non-fat Dry Milk Powder (for color) | 0.5 wt. % |
| Wheat Flour | Balance |

The breaded pieces were then ready for subsequent treatment, such as pre-cooking, and/or freezing, followed by packaging.

We claim:

1. A process for preparing a batter-free poultry meat product comprising:
    (a) adhering to the surface of a piece of uncooked poultry a dust of ungelatinized, high gluten flour free of batter-forming components and which is not capable of forming a continuous film of batter when it is applied to said surface;
    (b) hydrating said dust under conditions which render the hydrated dust capable of adhering to breading; and
    (c) adhering breading to said hydrated dust;
    wherein the product that is produced by said steps (a), (b) and (c) does not bear a layer of batter.

2. The process of claim 1 wherein said poultry is chicken.

3. The process of claim 2 wherein said piece of uncooked poultry is a piece of chicken from which the skin has not been removed.

4. The process of claim 3 wherein the dust adhered in step (a) covers essentially all of the skin.

5. The process of claim 2 wherein said piece of uncooked poultry is a piece of chicken from which the skin has been removed, exposing edible flesh.

6. The process of claim 5 wherein the dust adhered in step (a) covers essentially all of said exposed flesh.

7. The process of claim 2 further comprising, after step (c), freezing said piece.

8. The process of claim 7 further comprising, after said freezing step, cooking said piece.

9. The process of claim 2 further comprising, after step (c), cooking said piece.

10. A batter-free chicken product prepared in accordance with the process of claim 2.

11. The process of claim 1 wherein said piece of uncooked poultry is a piece of uncooked, marinated chicken.

12. A batter-free chicken product prepared in accordance with the process of claim 11.

13. A batter-free poultry meat product prepared in accordance with the process of claim 1.

* * * * *